(12) United States Patent
Sumita et al.

(10) Patent No.: US 10,400,343 B2
(45) Date of Patent: Sep. 3, 2019

(54) ELECTROLYTIC TANK AND ELECTROLYTIC METHOD FOR HIGH-EFFICIENCY DRY REPROCESSING

(71) Applicant: CLEAR INC., Tokyo (JP)

(72) Inventors: Osao Sumita, Tokyo (JP); Isao Ueno, Tokyo (JP); Takehiko Yokomine, Onojo (JP)

(73) Assignee: Clear Inc., Tokyo (JP)

( * ) Notice: Subject to any disclaimer, the term of this patent is extended or adjusted under 35 U.S.C. 154(b) by 0 days.

(21) Appl. No.: 15/740,994

(22) PCT Filed: Sep. 20, 2016

(86) PCT No.: PCT/JP2016/077666
§ 371 (c)(1),
(2) Date: Dec. 29, 2017

(87) PCT Pub. No.: WO2017/061267
PCT Pub. Date: Apr. 13, 2017

(65) Prior Publication Data
US 2018/0202057 A1    Jul. 19, 2018

(30) Foreign Application Priority Data
Oct. 5, 2015    (JP) .................. 2015-197856

(51) Int. Cl.
*C25C 3/34* (2006.01)
*C25C 7/00* (2006.01)
(Continued)

(52) U.S. Cl.
CPC .................. *C25C 3/34* (2013.01); *C25C 7/00* (2013.01); *C25C 7/02* (2013.01); *C25C 7/06* (2013.01); *G21C 19/44* (2013.01); *G21C 19/46* (2013.01)

(58) Field of Classification Search
CPC ........ G21C 19/42–19/44; G21C 19/48; Y20W 30/88–30/882; Y20W 30/884; C25C 3/34
See application file for complete search history.

(56) References Cited

U.S. PATENT DOCUMENTS

| | | | | |
|---|---|---|---|---|
| 5,009,752 A | * | 4/1991 | Tomczuk | .................. C25C 3/34 204/213 |
| 5,725,745 A | * | 3/1998 | Ikegaya | .................. C25D 7/04 204/198 |
| 6,689,260 B1 | | 2/2004 | Ahluwalia et al. | |

FOREIGN PATENT DOCUMENTS

| | | |
|---|---|---|
| JP | H04319699 A | 11/1992 |
| JP | H07167985 A | 7/1995 |
| JP | 2001141879 A * | 5/2001 |

OTHER PUBLICATIONS

Yoshida et al., English abstract and machine translation, JP-2001141879-A. (Year: 2001).*

(Continued)

*Primary Examiner* — Bryan D. Ripa
*Assistant Examiner* — Ho-Sung Chung
(74) *Attorney, Agent, or Firm* — Patterson + Sheridan, LLP

(57) ABSTRACT

A molten salt electrolysis tank, comprises: an anode feeder which is equipped with a mechanism for recovering deteriorated contact resistance that takes place between the metal fuel rod and the anode in the course of the anodic electrolysis; a cathode feeder which is controlled so as to have a potential in a range that causes U and/or Pu ions to be reduced to metal; a heating mechanism for locally heating the metal fuel rod and/or an excitation mechanism for bringing the metal fuel rod into a locally excited state; and a solenoid coil or a permanent magnet that is disposed between the anode feeder and the cathode feeder so as to improve separation efficiency of U and/or Pu ions by applying a combination of an electric field and a magnetic field.

20 Claims, 11 Drawing Sheets

(51) Int. Cl.
*C25C 7/02* (2006.01)
*C25C 7/06* (2006.01)
*G21C 19/44* (2006.01)
*G21C 19/46* (2006.01)

(56) References Cited

OTHER PUBLICATIONS

Matsumaru, Machine Translation, JP H4-319699 A. (Year: 1992).*
W.F. Murphy et al., Postirradiation Examination of U—Pu—Zr Fuel Elements Irradiated in EBR-II to 4.5 Atomic Percent Burnup, Argonne National Laboratory, Nov. 1969, 64 pages.
International Search Report dated Dec. 13, 2016, mailed in coounterpart International Application No. PCT/JP2016/077666, 2 pages.
Application No. 16853421.2, Extended European Search Report, dated Nov. 29, 2018, 8 pages.

* cited by examiner

US 10,400,343 B2

ELECTROLYTIC TANK AND ELECTROLYTIC METHOD FOR HIGH-EFFICIENCY DRY REPROCESSING

TECHNICAL FIELD

The present invention relates to a structure of a crucible for anode electrolysis using a high-temperature molten salt, for dry reprocessing a spent metal fuel pin containing uranium (U) and/or plutonium (Pu), an electrolysis device including the structure, and an electrolytic method. Further, the present invention relates to a method of enabling radioactive waste volume reduction by accelerating decay rates of radioactive nuclides discharged in a dry reprocessing process.

BACKGROUND ART

A reprocessing process of collecting U237, U233 and the like from a spent nuclear fuel pin is broadly divided into wet reprocessing referred to as PUREX process using an aqueous solution based on tributyl phosphate (TBP), nitric acid or the like, and dry reprocessing using a molten salt electrolytic method. Conventionally, a spent oxide fuel pin has been processed by the wet reprocessing method. In the wet reprocessing, it is necessary to dissolve oxide fuel pellets first, and for this reason, highly acidic nitric acid has been used. However, as a result, damage such as corrosion to processing equipment is severe, and thus still no wet reprocessing facility is in commercial operation in Japan. Furthermore, operating a wet reprocessing facility requires high cost.

On the other hand, the dry reprocessing method is small scale, and thus reduction in cost is possible and critical management is easy. The dry reprocessing method is developed for metal fuel pins, and is a process of extracting U, Pu mainly from a U—Pu—Zr ternary alloy fuel pin. Also, in a fast reactor, the energy of neutrons is high, and it is not necessary to refine fuel with high purity, thus the dry reprocessing with a low purity of collected substances is likely to be applied.

In the currently studied dry reprocessing process, a fuel assembly (a bundle of fuel pins) taken out from a fast reactor is first disassembled in an "assembly disassembling process". Subsequently, these fuel pins are sheared into short pieces of the order of several cm length in a "fuel element shear process". The spent fuel chips obtained in this manner are dissolved in a lithium chloride-potassium chloride (LiCl—KCl) molten salt in the next "electrolytic refining process", and actinoid elements are separated from nuclear fission products and are collected at a solid cathode or a liquid metal cadmium (Cd) cathode. A solvent such as a molten salt or liquid metal cadmium adheres to the actinoid elements collected here. Thus, these adhering substances are separated by distillation at a high temperature in a "cathode collected substance processing process". Zirconium (Zr) or U is added to thus obtained actinoid metal to achieve a target concentration, and is melted and cast into a rod-shaped fuel alloy in an "injection molding process" at a high temperature. The fuel pin is sealed in a stainless-steel cladding tube in a "fuel element sealing process", thereby creating a new fuel pin, which is further bundled into an assembly in an "assembly building process", and is reloaded to a fast reactor.

CITATION LIST

Patent Literature

PATENT LITERATURE 1: WO 2012/102092A1

Non Patent Literature

NON PATENT LITERATURE 1: Dry (non-aqueous) Processing of Used Nuclear Fuel, Terry Todd, Idaho National Laboratory, Panel on "Exploring the Options for Used Nuclear Fuel in Light of U. S. and International Decisions", Waste Management, 2012, Feb. 27, 2012

NON PATENT LITERATURE 2: Asian Nuclear Prospects 2010, "Pyrochemical Reprocessing of Spent Fuel by Electrochemical Techniques Using Solid Aluminium Cathodes", P. Soucek, R. Malmbeck, C. Nourry, and J.-P. Glatz, European Commission, JRC, Institute for Transuranium Elements, Postfach 2340, 76125 Karlsruhe NON PATENT LITERATURE 3: Surface Engineering for Bone Implants: A Trend from Passive to Active Surfaces, Ruggero Bosco, Jeroen Van Den Beucken, Sander Leeuwenburgh and John Jansen, Coatings, 2012, 2(3), 95-119

NON PATENT LITERATURE 4: Accurate Simulations of Electric Double Layer Capacitance of Ultramicroelectrodes, Hainan Wang and Laurent Pilon*, the JOURNAL OF PHYSICAL CHEMISTRY C, 2011, 115, 16711-16719

NON PATENT LITERATURE 5: Final Report "ACCELERATED BETA DECAY for DISPOSAL OF FISSION, FRAGMENT WASTES", Principal Investigator: Howard R. Reiss, Physics Department, American University, Washington, D.C. 20016-8058, Grant No. DE-FG02-96ER12195, Mar. 6, 2000

NON PATENT LITERATURE 6: Nuclear Half-life Modification Technology, GDR GREEN NEWSLETTER 001, Submitted by Larry Geer for GDR, "Radioactivity Deactivation at High Temperature in an Applied DC Voltage Field Demonstrated in 1964 Full story on GDR.org", Larry Geer & Cecil Baumgartner, 2014/10/15

NON PATENT LITERATURE 7: "Accelerated alpha-decay of 232U isotope achieved by exposure of its aqueous solution with gold nanoparticles to laser radiation", A. V. Simakin, G. A. Shafeev, Wave Research Center of A. M. Prokhorov General Physics Institute of the Russian Academy of Sciences, Vavilov Street, Moscow 119991, Russian Federation NON PATENT LITERATURE 8: "Correlation Between Microstructure and Corrosion Behavior of Two 90Cu10Ni Alloy Tubes", Ma Aili, Jiang Shengli, Zheng Yugui, Yao Zhiming, Ke Wei, Xia Shuang, Acta Metallurgica Sinica (English Letters), 2014, 27(4), 730-738

NON PATENT LITERATURE 9: "POSTIRRADIATION EXAMINATION OF U—Pu—Zr FUEL ELEMENTS IRRADIATED IN EBR-I 1 TO 4.5 ATOMIC PERCENT BURNUP", W. F. Murphy, W. N. Beck, F. L. Brown, B. J. Koprowski, and L. A. Neimark ARGONNE NATIONAL LABORATORY, 9700 South Cass Avenue, Argonne, Ill. 60439

SUMMARY OF INVENTION

Technical Problem

The most important factor in a dry reprocessing system is the "electrolytic refining technique" (NON PATENT LITERATURE 1). FIG. 1 illustrates a conceptual diagram of a dry reprocessing system. Referring to FIG. 1, finely cut metal fuel is inserted in a basket-shaped stainless-steel anode structure, and the metal fuel is subjected to anodic (positive electrode) dissolution in a LiCl—KCl salt which is melted at approximately 500° C., in accordance with the following formula. Therefore, for a crucible, it is necessary to use a material that is resistant to a high-temperature molten salt. In Argonne National Laboratory (ANL) that has developed the dry reprocessing, a graphite crucible coated with yttria ($Y_2O_3$) is used. However, development of a material, which is more heat resistant and corrosion resistant than the above-mentioned material, is also proposed. Also, in order to generate high-temperature molten salt liquid, it is desirable to select an inductively heatable material for the crucible itself. In this case, it is necessary to coat the inner surface of the graphite crucible with corrosion resistant oxide or ceramic.

FIG. 2 illustrates a schematic sectional view of an example of a conventional electrolysis device for dry reprocessing. In the electrolysis device, an anode feeder (positive electrode) 30, a cathode feeder (negative electrode) 40, a liquid Cd electrode feeder 50 are set in a crucible 10, LiCl—KCl molten salt 20 is put in the crucible, argon gas is injected into the space above the molten salt 20, and a lid 12 is attached to the crucible in order to create an argon gas atmosphere. The anode feeder is attached with a porous basket 33 which stores metal fuel pins and through which a metal-molten salt and anodically dissolved metal ions are permeable. A cathode 41 at the leading end of the rod-shaped cathode feeder 40 is integrated with the cathode feeder 40. In order to reduce an excess voltage of the cathode and improve an electrolytic refining efficiency, multiple cathode feeders may be disposed around the anode feeder. In addition, the Cd electrode feeder 50, which is liquid metal at a high temperature, is provided. This feeder is immersed in and electrically connected to liquid metal Cd 62 in a liquid metal Cd tank 60. In addition, in order to heat and melt the LiCl—KCl salt in the crucible at 500° C., the outer periphery of the crucible is provided with coil and heated utilizing electromagnetic induction phenomenon. When metal fuel elements (fuel pins) 33 are put in the anode basket 31 and anodic polarization is performed, anodic dissolution is performed on U and/or Pu as shown by the following formulas.

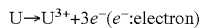  [CHEM. 1]

$$U \rightarrow U^{3+} + 3e^- \quad (e^-\text{:electron})$$

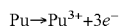  [CHEM. 2]

$$Pu \rightarrow Pu^{3+} + 3e^-$$

The dissolved $U^{3+}$ and/or $Pu^{3+}$ ions are reduced to metal on the cathode surface. Like this, an oxidation-reduction reaction of metal is important. However, out of nuclear fission products (FP) which have a higher oxidation-reduction potential than U, Pu and are unlikely to be reduced, alkaline metals (AL), rare earth elements (RE), alkaline earth metals (ALE) are highly likely to be present as ions. In contrast, part of U, Pu and remaining minor actinoid nuclides (MA) are deposited on metal cadmium (Cd) 50. An important factor in these reduction reactions is the positions of an oxidation-reduction potential of U, Pu, MA and the like. FIG. 3 illustrates a positional relationship between these oxidation-reduction potentials of metal/metal ions by P. Soucek et al. (NON PATENT LITERATURE 2). As illustrated in FIG. 3, the oxidation-reduction potential depends on the electrode material. However, in the case of electrolytic refinement, large change in the oxidation-reduction potential is more advantageous, and thus, W or Al is desirable.

In contrast to the reduction potentials of $U^{3+}/U$ and/or $Pu^{3+}/Pu$, the metal reduction potentials of many other MA elements, alkaline metals, alkaline earth metals, rare earth elements are lower potentials. By utilizing such a difference in oxidation-reduction potentials, the cathode which is settable to the reduction potential of U and/or Pu, and the liquid metal Cd cathode which is settable to the reduction potentials of other metal ions are separated and set, thereby making it possible to separate and refine U and/or Pu.

Next, the measurement of a cyclic voltammogram is described. For the measurement, a model spent metal fuel pin sample was first produced. Although actinoid element metal is necessary for the sample production for experiments, oxides of U, Pu, Am, Cm, Np and the like, which are metal oxides difficult to be electrolytically reduced, were reduced by using metal Li, thereby producing the model spent metal fuel pin sample. An actinoid element oxide and LiCl—KCl were put in the crucible, and dissolved in a molten salt at 1000° C. After the dissolution operation, metal Li was further added to the crucible, and reduction processing was performed at approximately 1000° C. using argon gas as a cover gas. A model spent metal fuel pin sample was produced by the processing.

The cyclic voltammogram of this model fuel pin was measured with a reference of Ag/AgCl reference electrode in a LiCl—KCl molten salt at approximately 500° C. The result is illustrated in FIG. 4. As seen from FIG. 4, anodic dissolution tends to occur the most at approximately −1.3 V for U {U (0)}, and at approximately −1.6 V for Pu {Pu (0)}. In other words, an anodic dissolution rate decreases as the potential deviates from the above-mentioned potential. Therefore, it is important to maintain the potential of the metal fuel pin in an anodic dissolution region.

When the phenomena mentioned above are taken into consideration, in order to process the spent nuclear fuel efficiently, the following points need to be improved.

1. Improvement on Anodic Dissolution Rate of Metal Fuel
a. Contact: In the present invention, finely cut metal fuel pin elements (fuel pins) are put in a basket-shaped anode electrode and electrolyzed. As anodic dissolution proceeds, the surfaces of the metal fuel pins are dissolved, and thus it is probable that contact between the basket-shaped anode and the metal fuel rods becomes poor. In order to perform anodic dissolution of the metal fuel pins efficiently, it is necessary to take measures against the poor contact.
b. Potential: As described above, anodic dissolution of metal highly depends on the potential.
c. Temperature: The dissolution rate is higher at a higher temperature.
d. Flow rate: It is necessary to quickly remove dissolution products from the surface of metal.
2. Selection of Dissolved U, Pu Metal Ions
a. Setting of the cathode at which U and Pu are selectively reduced.
b. U and Pu are made selectively reducible at a potential higher than the reduction potentials of alkaline metals AL, alkaline earth metals ALE and the like. Then anodically dissolved $U^{3+}$, $Pu^{3+}$ ions are controlled at a potential suitable for phenomenon of reduction to metal on the surface of the cathode. Consequently, alkali metal ions, alkaline earth metals ions are not reduced to metal, and are present in an ion state, thus are easy to be separated.
c. Most of MA and part of the U, Pu ions are made to be absorbed in the liquid metal Cd cathode.

d. Two types of cathodes are set: a rod-shaped main cathode at which metal reduction of U, Pu is performed, and a liquid metal Cd cathode at which the remaining U, Pu, MA and other elements are collected.

e. Insoluble substances fall in a process of anodic dissolution of the spent nuclear fuel pin placed in the basket-shaped electrode. The fallen substances are made to be absorbed in the liquid metal Cd.

f. In order to improve a separation efficiency of U, Pu ions, other MA, alkaline elements, alkaline earth metal ions, similarly to the coils (NON PATENT LITERATURE 3) used in a magnetron sputtering method, coils are set in the crucible so as to form a magnetic field substantially perpendicular to a direction connecting the anode and the cathode.

3. Reduction from Metal Ion to Metal a. It is reported that Pu ions and the like react with the liquid metal Cd based on the following chemical equation, and dendrite-shaped crystals are grown in the liquid metal Cd.

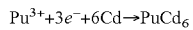[CHEM. 3]

$$Pu^{3+}+3e^-+6Cd \rightarrow PuCd_6$$

Formation of the dendrite reduces the electrolytic refining efficiency, thus it is desirable to prevent formation of the dendrite as much as possible by agitating the liquid metal Cd, for instance.

Solution to Problem

An object of the present invention is to solve the above-mentioned problem that inhibits the efficiency of the dry reprocessing method and to further improve the electrolytic refining efficiency. An electrolytic tank of the present invention to achieve this is a molten salt electrolysis tank in which electrolytic refining is performed by dissolving a spent metal fuel pin through anodic electrolysis in a crucible filled with a molten salt to cause U and/or Pu to be reduced and precipitated once again on a surface of a cathode, the spent metal fuel pin containing elements including zirconium (Zr) and uranium (U), U and plutonium (Pu), or Zr and U and Pu, the electrolytic tank comprising:

an anode feeder that is provided with a mechanism for recovering from deterioration of contact resistance between the metal fuel pin and the anode in a course of the anodic electrolysis;

a cathode feeder that is connected to the cathode and controlled at a potential in a range that causes U and/or Pu ions to be reduced to metal;

a heating mechanism for locally heating the metal fuel pin and/or an excitation mechanism for bringing the metal fuel pin to a locally excited state; and a solenoid coil or a permanent magnet that is disposed between the anode feeder and the cathode feeder to improve a separation efficiency of the U and/or Pu ions by applying a combination of an electric field and a magnetic field.

In addition, the present invention also includes an electrolytic method in which the electrolytic refining efficiency is improved by using the aforementioned electrolytic tank.

As a mechanism for recovering from deterioration of contact resistance between the metal fuel pin and the anode in a course of the anodic electrolysis, the present invention may include a mechanism in which a leading end portion of the anode feeder is formed in a basket shape to receive the spent metal fuel pin, a pressing plate for pressing the metal fuel pin is disposed inside the basket-shaped anode feeder, the mechanism allowing the pressing plate to be automatically pressurized and moved in a course of the anodic electrolysis. Furthermore, in order to reduce the contact resistance between the metal fuel pin and the anode, vibration may be applied to a contact portion between the anode feeder and the metal fuel pin. The mechanical oscillation frequency is preferably 50 to 200 kHz.

Furthermore, the heating mechanism or the excitation mechanism may include a mechanism that applies a low-frequency electromagnetic field of 1 kHz-20 MHz to the anode feeder.

Furthermore, at a lower portion of the anode feeder, the electrolytic tank may include a liquid Cd layer which is electrically connected to a Cd cathode feeder for reducing and adsorbing metal such as minor actinoid other than the anodically dissolved U, Pu.

Furthermore, the electrolytic tank may include a mechanism in which a rotating device having a horizontal rotational shaft is mounted externally of the crucible, and which separates and diffuses a molten salt on surfaces of the anode feeder and the cathode feeder by periodically swinging the crucible around the rotational shaft to agitate the molten salt or by agitating the molten salt using a mechanical oscillation mechanism.

As another method of agitating the molten salt, the electrolytic tank may include a pipe in the crucible for circulating the molten salt, and a filter and a circulation pump in the pipe, by which molten salt may be circulated and agitated, a molten salt on surfaces of the anode feeder and the cathode feeder may be separated and diffused, and the molten salt may be further purified.

Furthermore, in the present invention, in order to improve the separation efficiency of U and/or Pu ions, a magnetic field may be applied using the solenoid coil or the permanent magnet in a direction that forms an angle of 60° to 90° with respect to a direction of an electric field applied between the anode feeder and the cathode feeder.

In addition, a dry reprocessing method that enables radioactive waste volume reduction is also provided by accelerating decay rates of radioactive nuclides discharged in a dry reprocessing process by applying a low-frequency electromagnetic field. Specifically, the electrolytic tank includes application of a low-frequency electromagnetic field of 100 kHz-20 MHz to the spent metal fuel pin and radioactive metal ions.

Furthermore, in the present invention, in order to accelerate β-decay rate, full-wave rectified or half-wave rectified AC power supply may be used as an electrolytic current of the anodic electrolysis, and an electric field having an AC component of $10^5$-$10^7$ V/cm may be applied to surface layers on the anode feeder and the cathode feeder.

Furthermore, α-decay rate and/or β-decay rate may be accelerated by irradiating the anode feeder and/or the cathode feeder with a laser beam as the excitation mechanism.

Advantageous Effects of Invention

The present invention makes it possible to provide a small-sized high-temperature molten salt electrolysis crucible with a high electrolytic refining efficiency, an electrolysis device provided using the crucible, and an electrolytic method. In addition, another embodiment of the present invention enables reduction in the concentration of radioactive elements or radioactive waste volume reduction by accelerating the β-decay rate.

DESCRIPTION OF EMBODIMENTS

The content and effect of the present invention and are described in the following embodiments.

Embodiment 1

Figure 1:
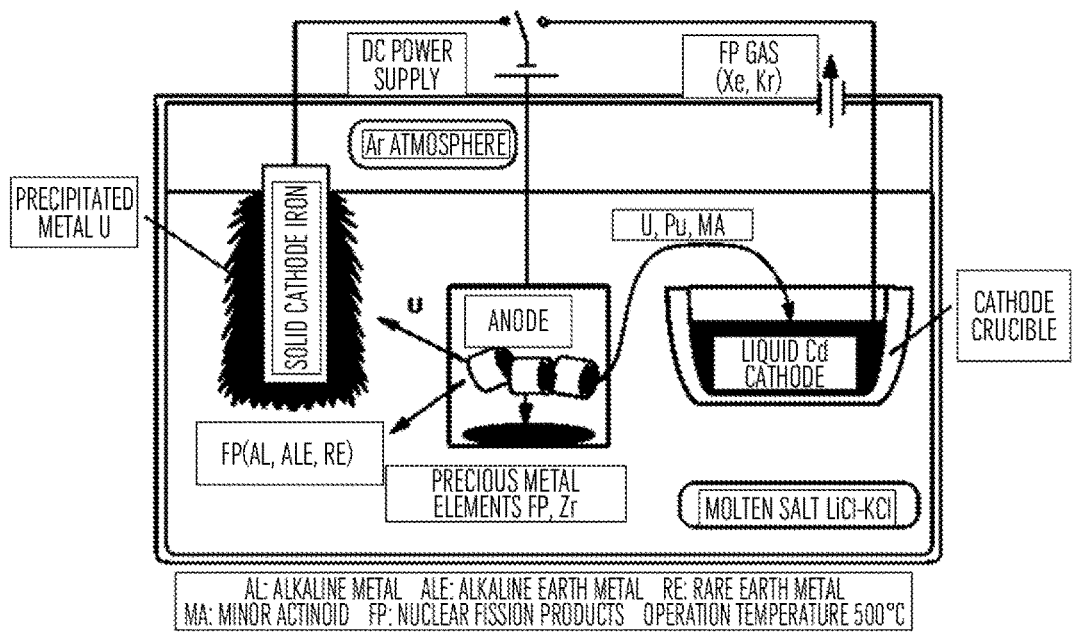
FIG. 1 is a conceptual diagram of a dry reprocessing system.
Figure 2:
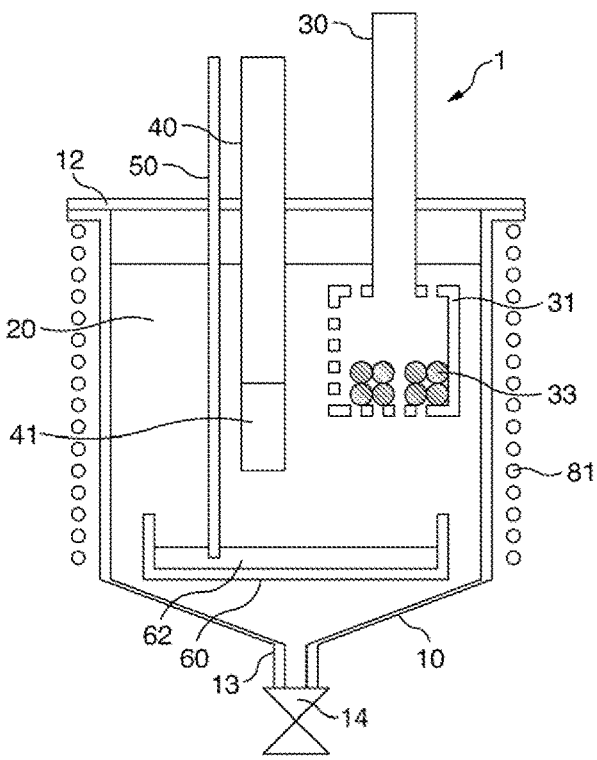
FIG. 2 is a schematic sectional view of an electrolysis device for dry reprocessing by a conventional technique.
Figure 3:
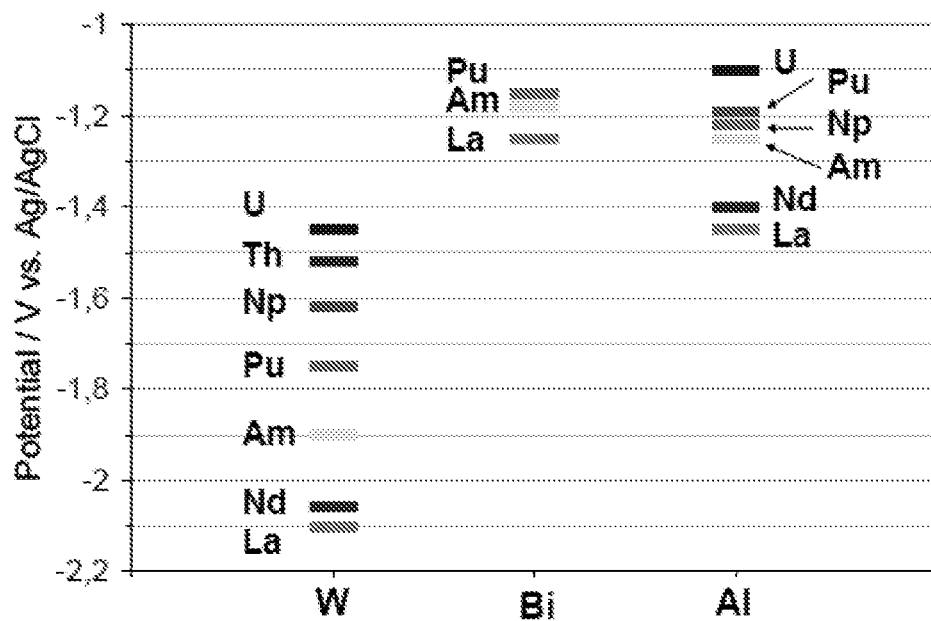
FIG. 3 illustrates oxidation-reduction potentials of transuranic elements.
Figure 4:
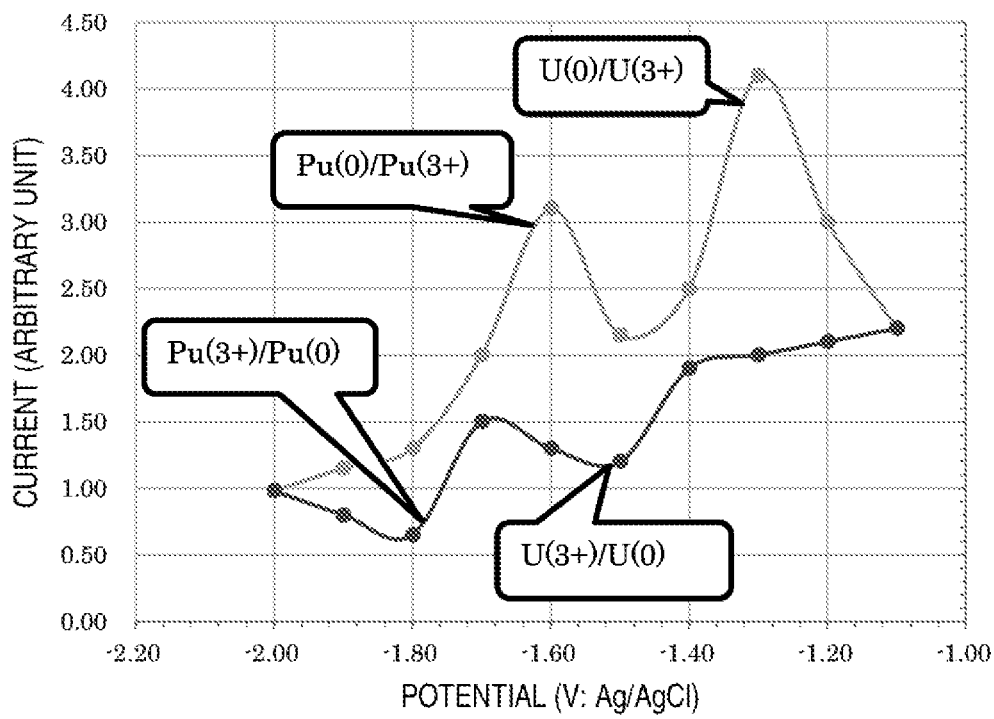
FIG. 4 illustrates a cyclic voltammogram of LiCl—KCl—$PuCl_3$—$UCl_3$.
Figure 5:
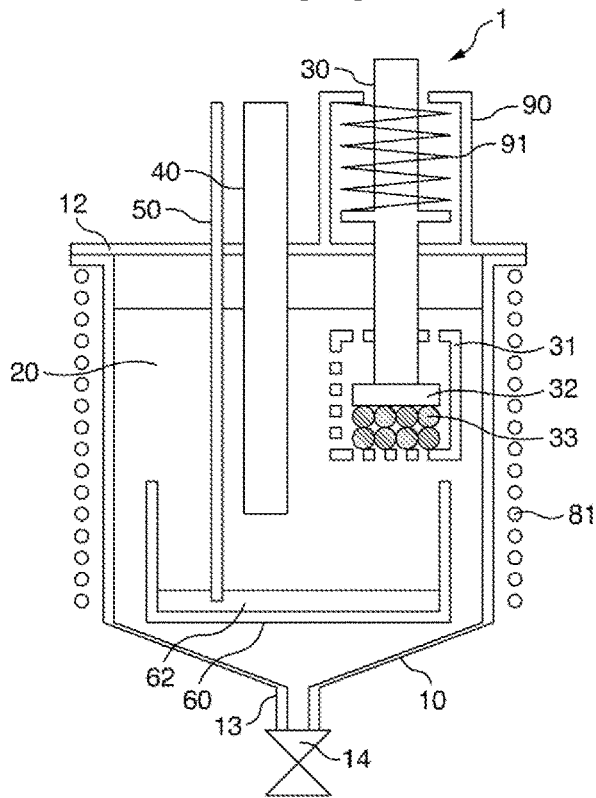
FIG. 5 is a schematic sectional view of a crucible for electrolytic refinement with an increased metal fuel pin contact efficiency according to an embodiment of the present invention.

First, a method of favorably maintaining a contact resistance between a basket-shaped anode and finely cut metal fuel rod pins is described. As illustrated in FIG. 5, a feeder 30 provided with a metal fuel rod pin pressing plate 32 is inserted into a basket-shaped anode 31 so as to bring finely cut metal fuel rod pins 33 housed in the basket-shaped anode of a basic-type crucible illustrated in FIG. 2 into intimate contact with the basket-shaped anode 31. In order to press the finely cut metal fuel rods against the basket-shaped anode, a pressurizing body spring 91 for pressurizing the feeder 30 provided with a pressing plate is mounted inside an anode pressurizing body cover 90. The spring force presses (presses with a force of 10,000 $N/m^2$ in the present embodiment) the cut metal fuel pin against the basket-shaped anode, and prevents poor contact of the metal fuel pin in a course of the anodic dissolution.

Figure 6A:
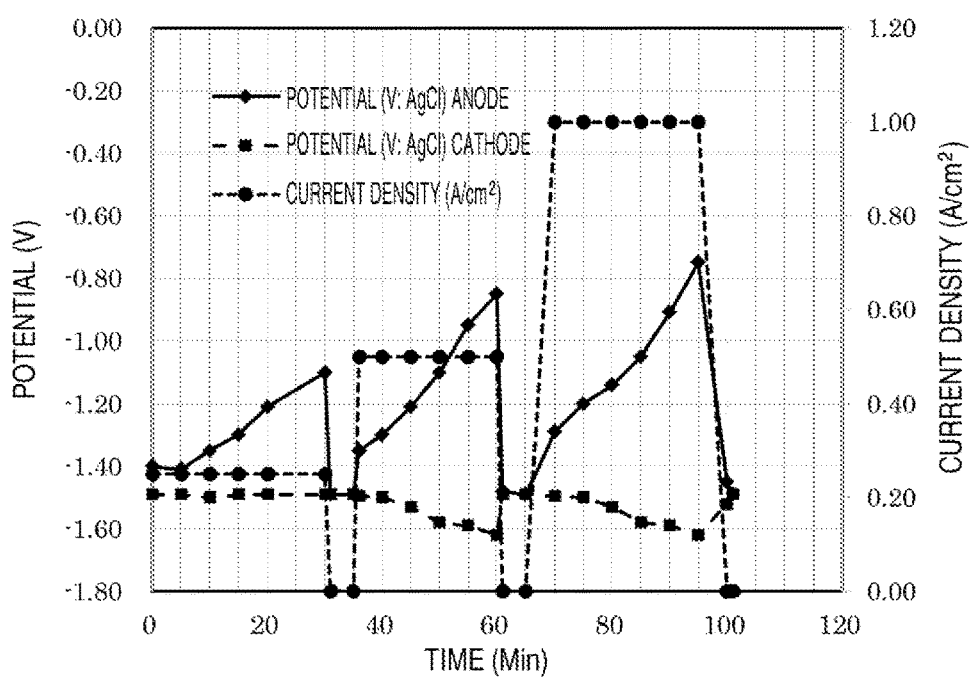
FIG. 6A illustrates a change in the potential of metal fuel at the time of electrolytic refinement under the condition that no pressurizing spring is provided.

FIG. 6A illustrates a current which flows through the U metal fuel pin, and a change in the potential associated with the anodic dissolution when the pressurizing spring 91 illustrated in FIG. 5 is not provided. FIG. 6A illustrates a change in the potential of the metal fuel pin anode in anode reaction, and in the cathode potential when the current density is changed to 0.25, 0.5, 1.0 $A/cm^2$. The cathode potential has a small change, whereas the anode potential has a large change, and has shifted from approximately −1.4 V to approximately −1 V over time. The larger the application current is, the higher the shift of potential is. As described above, when the potential shifts from appointment −1.3V to the higher side, an anodic dissolution reaction decreases. A large shift in the potential like this indicates reduction in the electrolytic refining efficiency.

Figure 6B:
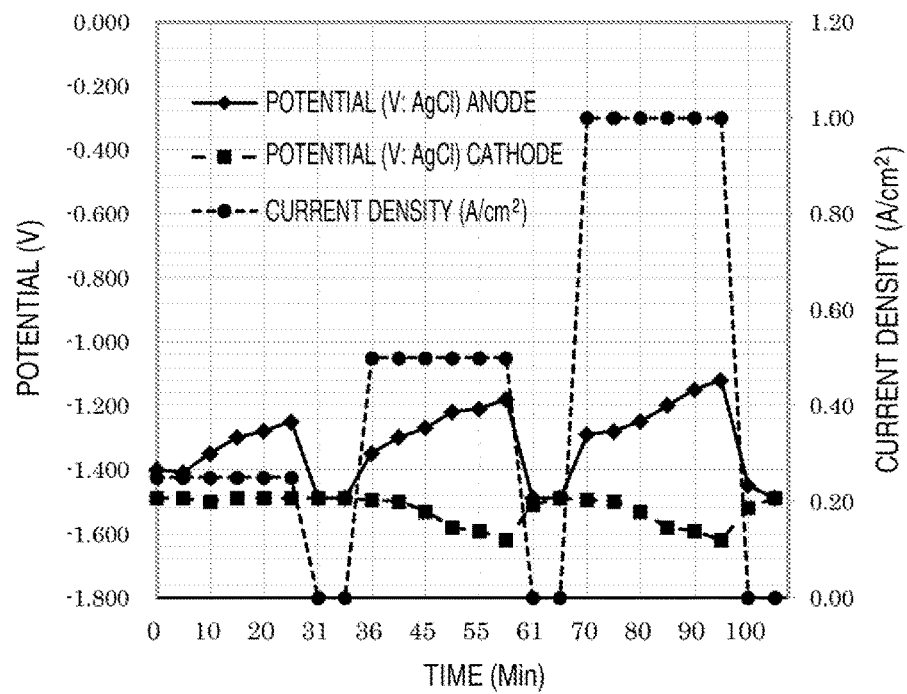
FIG. 6B illustrates a change in the potential of metal fuel at the time of electrolytic refinement when a pressurizing spring is utilized.

In contrast, when the contact between the metal fuel rods and the basket-shaped anode is maintained at a low level using a spring structure as illustrated in FIG. 5, the change in the anode potential has become small as illustrated in FIG. 6B. The result indicates that it is possible to improve the refining efficiency by maintaining the contact between the anode and the metal fuel pins at a low level by the spring structure.

Embodiment 2

Figure 7A:
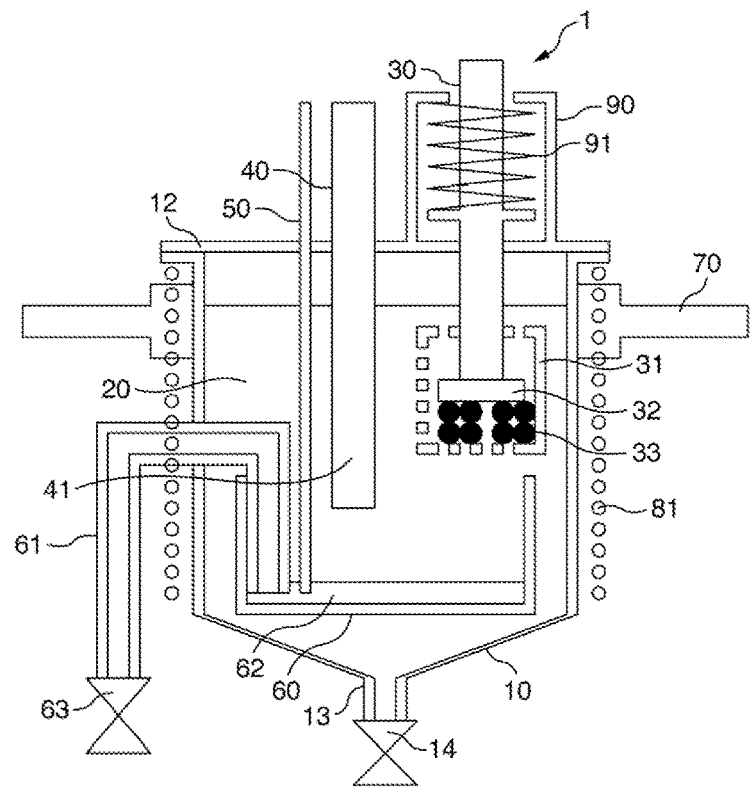
FIG. 7A is a schematic sectional view of a crucible structure equipped with a swing mechanism according to another embodiment of the present invention.
Figure 8:
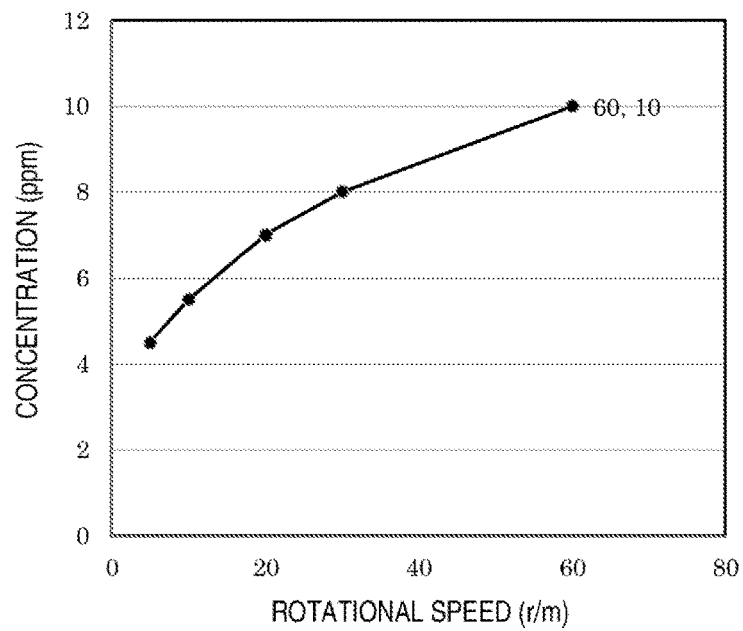
FIG. 8 is a graph illustrating an effect of rocking of the crucible to an anodic dissolution rate.

As the result shows in FIGS. 6A and 6B, when the electrolytic current is made constant, the potential of the metal fuel pin anode is shifted to the higher side over the electrolysis time. This indicates that the anode surface is rapidly changing to an oxidizing substance layer. In order to improve the electrolysis efficiency, a mechanism, which quickly separates the oxidizing substances from the surface of the anode electrode, needs to be incorporated into the electrolytic tank. Thus, in order to improve the separation efficiency, the molten salt in the crucible is designed to be allowed to agitate. A first embodiment is illustrated in FIG. 7A. In the present embodiment, a rotational shaft 70 is mounted on the sidewall of the crucible. The crucible is brought in a swinging motion around the rotational shaft, and the swinging motion causes the molten salt in the vicinity of the surface of metal fuel pins in the basket-shaped anode electrode to be swung, thereby promoting separation and diffusion of electrolysis products on the surface. The effect of the rotational (round trip) speed to anodic dissolution of the metal fuel is illustrated in FIG. 8. The swinging motion can improve the anodic dissolution rate. Furthermore, as described above, it is probable that the dendrite of $PuCd_6$, which reduces the electrolytic refining efficiency, is formed in the liquid metal Cd. When the liquid metal Cd is swung, the dendrite is broken. Like this, the swinging motion of the crucible using the rotational shaft is effective for the improvement of the electrolytic refining efficiency.

Figure 7B:
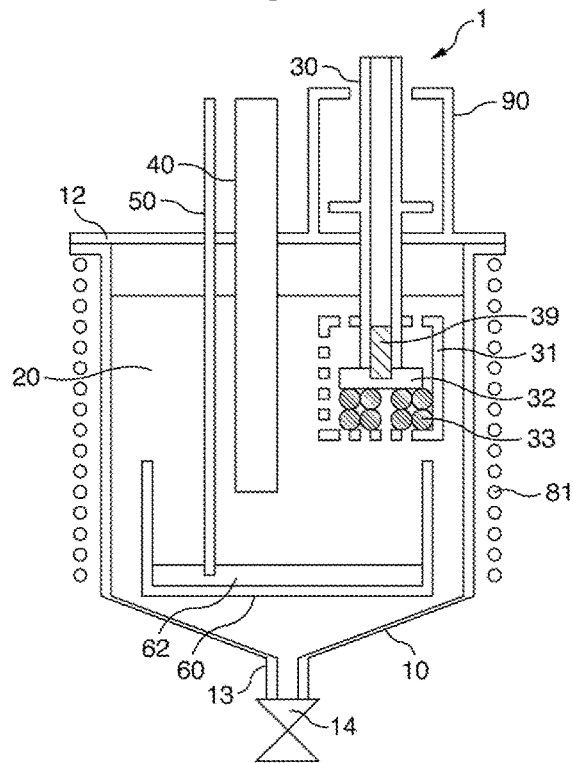
FIG. 7B is a schematic sectional view of a crucible structure equipped with a vibration mechanism that generates mechanical oscillation according to another embodiment of the present invention.

Another embodiment is illustrated in FIG. 7B. In the present embodiment, a mechanical oscillation mechanism 39 is added to the basket-shaped anode 31, a junction portion between the fuel pin pressing plate 32 and the anode feeder 30. Thus, the contact resistance between the basket-shaped anode 31 and the fuel pins is reduced by applying mechanical oscillation to the fuel pins 33 which anode dissolve.

Figure 7C:
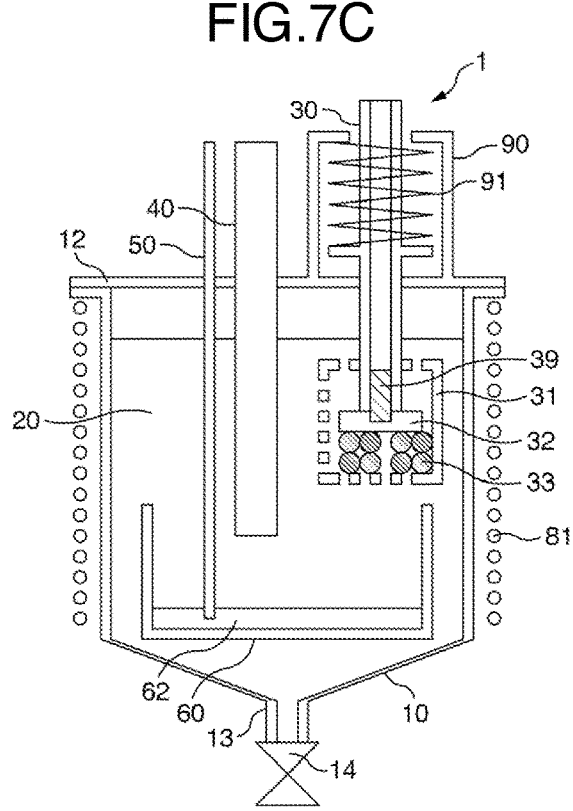
FIG. 7C is a schematic sectional view of a crucible structure equipped with a vibration mechanism or the like that generates mechanical oscillation according to another embodiment of the present invention.

Another embodiment is illustrated in FIG. 7C. In the present embodiment, the fuel pins 33 are brought into intimate contact with the basket-shaped anode 31 using the fuel pin pressing plate 32 and the fuel pin pressing plate spring 91 illustrated in FIG. 7A. Furthermore, similarly to FIG. 7B, the mechanical oscillation mechanism 39 is added to the basket-shaped anode 31, the junction portion between the fuel pin pressing plate 32 and the anode feeder 30. The contact resistance can be further reduced by the effect of both spring and vibration like this.

As another example of mechanical oscillation, application of ultrasonic vibration is effective. For instance, it is effective to irradiate with ultrasonic wave from 10 kHz to 200 kHz, having an output of 1 $W/cm^2$ or higher. It is also possible to use mechanical oscillation from 50 Hz to 10 kHz other than the ultrasonic wave.

Embodiment 3

Figure 9:
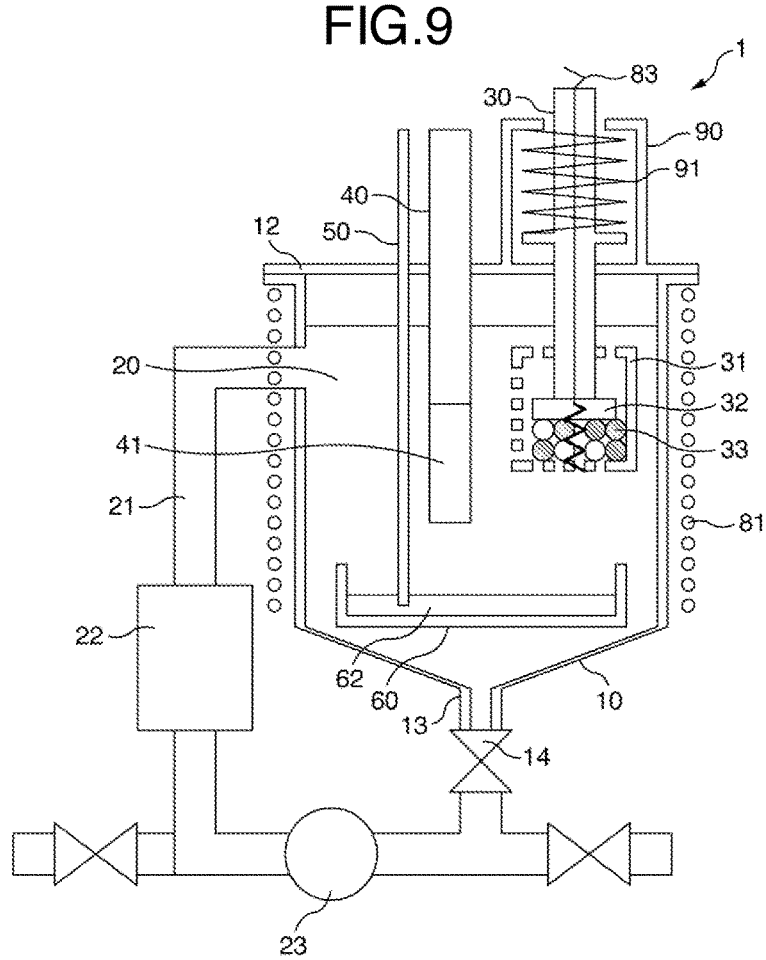
FIG. 9 is a schematic sectional view of a crucible structure provided with a molten salt circulation line according to still another embodiment of the present invention.

Another embodiment that can agitate the molten salt in the crucible is illustrated in FIG. 9. A mechanism that can circulate the molten salt is incorporated into the crucible structure of the present embodiment. A molten salt circulation pipe 21 is mounted in the crucible body, and a filter 22 and a circulation pump 23 are further mounted in the pipe. The molten salt can be agitated by circulating the molten salt with the circulation pump, and similarly to Embodiment 2, improvement of the electrolytic refining efficiency can be achieved.

Embodiment 4

Figure 10A:
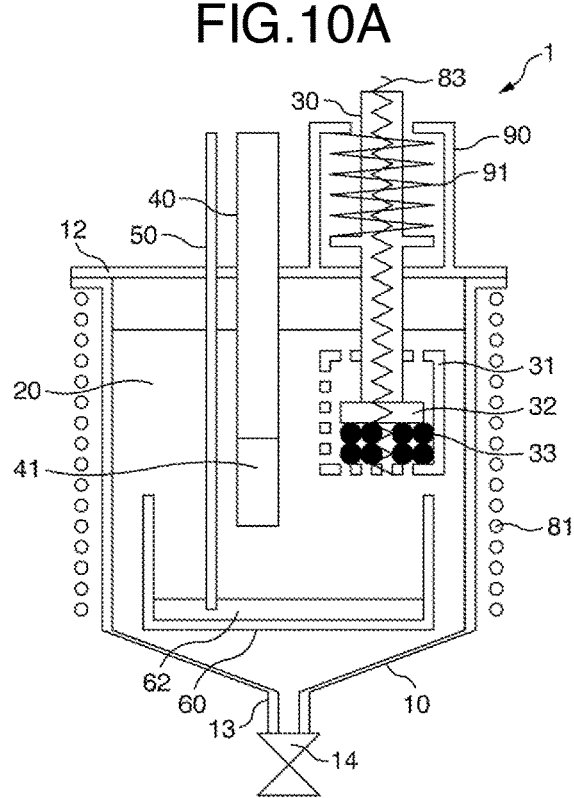
FIG. 10A is a schematic sectional view of a crucible structure capable of heating an anode feeder according to still another embodiment of the present invention.

Next, FIG. 10A illustrates an embodiment of a crucible provided with a heating mechanism for increasing the anodic dissolution rate by raising the temperature of the metal fuel rods. The entire crucible is inductively heated using a coil 81 installed externally of the crucible, and the temperature of the molten salt is set to approximately 500° C. In addition, the metal fuel rods which are to be anodically dissolved are locally heated to raise the temperature, and the anodic dissolution rate is efficiently improved. As illustrated in FIG. 10A, a coil 83 is installed in a pipe-shaped metallic anode feeder 30, the anode feeder 30 is heated by applying a high frequency wave to the coil, and the metal fuel pins 33 are locally heated by thermal conduction. Here, the pipe-shaped feeder is made of stainless steel, where the total length is 30 cm, the diameter is 10 cm $\Phi$, and the thickness is 1 cm. A coil is installed in a hollow with an inner diameter of 8 cm. For the temperature, first, heating for increasing the temperature by 100° C. is set with a target of 600° C., and the rate of temperature increase is further set to 10° C./min. Although a trial calculation of necessary power under this condition gives 900 W, an actual amount of power necessary for temperature increase heating of the metal fuel rods is estimated to be 2.5 times 900 W in consideration of a loss or the like. In consideration of the temperature increase heating condition of 10° C./min, 600 seconds, practically, a high frequency power of 2.2 kW is necessary. The frequency of electromagnetic waves to be applied is set to 50-10 kHz.

Figure 11:
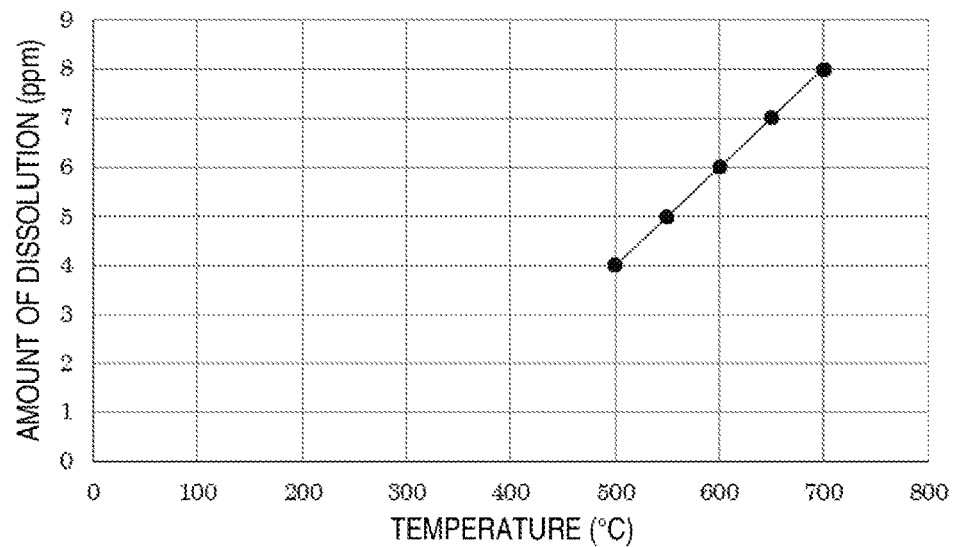
FIG. 11 is a graph illustrating a relationship between the amount of anodic dissolution of a metal fuel pin and temperature.

Like this, the temperature of the metal fuel pins is raised stepwise, and a change in the amount of anodic dissolution was measured. The result is illustrated in FIG. 11. The amount of anodic dissolution is clearly increased by raising the temperature of the fuel pins. Like this, when a solenoid coil is installed inside the anode feeder, and the temperature of the metal fuel pins is raised by applying AC wave electromagnetic field to and locally inductively heating the metal fuel pins, an effect of large increase in the dissolution amount has been verified.

Figure 10B:
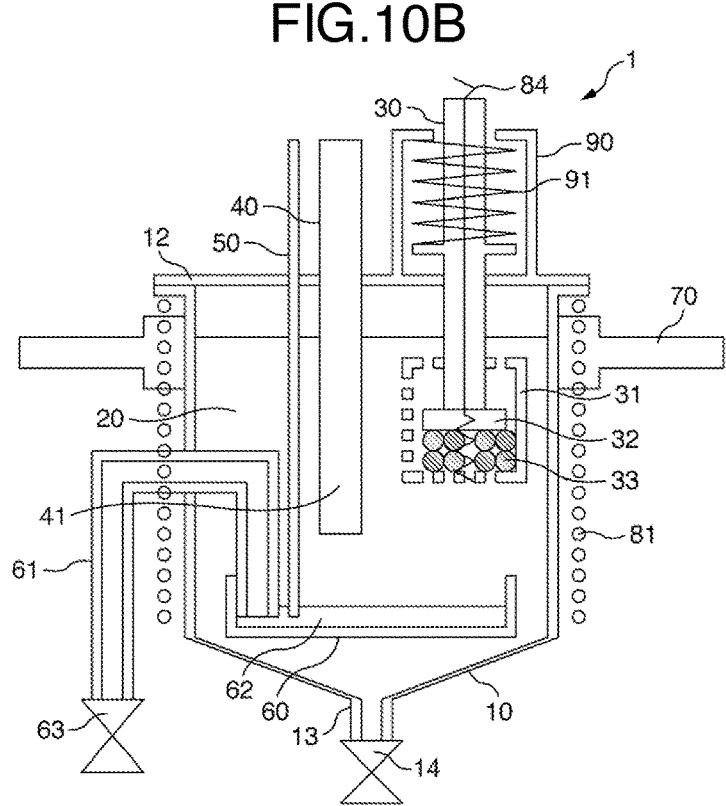
FIG. 10B is a schematic sectional view illustrating a local heating method for a metal rod pin according to still another embodiment of the present invention.

In addition, as another embodiment, when the metal fuel pins are anodically dissolved as illustrated in FIG. 10B, direct local inductive heating of a portion which is anodically dissolved is effective for obtaining a temperature increase effect. In order to inductively heat the surface locally, it is necessary to consider a relationship between the frequency of high-frequency wave and a current penetration depth. The current entry depth depends on the temperature and the material. The present invention assumes the precondition of a molten salt environment at approximately 500° C. When a current penetration depth of several μm—several mm is taken into consideration at the temperature, a range of 1 kHz-20 MHz (high frequency region) is desirable as the range of frequency and a range of 100 W or greater is desirable as the output. The local heating method is also advantageous for enabling reduction of heating temperature of the entire crucible and of the cost for reprocessing.

Furthermore, when the fuel pins as the anode are anodically dissolved, a potential difference of 1-2 V is applied to the dissolution surface of the fuel pins. For instance, in the case of water electrolysis, it is expected that most of the potential is applied to approximately 10 Å (NON PATENT LITERATURE 4). It is assumed that the electrolytic reaction of the present invention is similar to the above reaction mechanism. Also, K, Li, Cl are used in the dry reprocessing, and when the ions of these and the size of $H_2O$ are compared, as compared with the case of water electrolysis, the thickness of an electric double layer in a dry reprocessing tank is considered to be several times greater. Therefore, in the case of dry reprocessing, when it is assumed that the thickness of the electric double layer is of the order of several times greater in consideration of ion radius and the like, the intensity of the electric field is $10^5$-$10^7$ V/cm.

Embodiment 5

Figure 12:
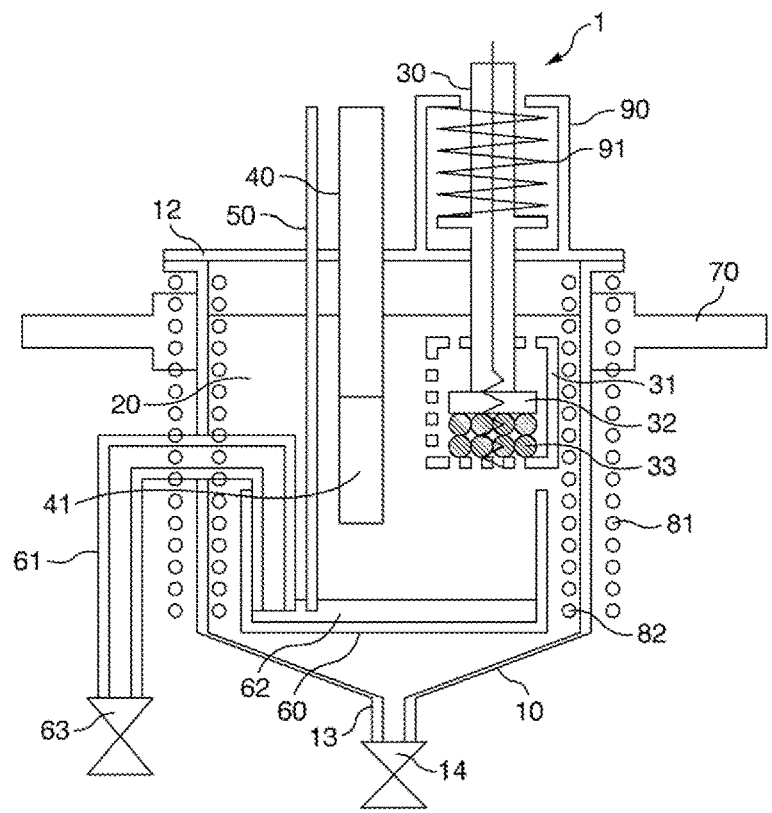
FIG. 12 is a schematic sectional view of a crucible structure which utilizes a magnetic field generated by a solenoid coil and is suitable for improvement of a separation efficiency of U and Pu ions according to still another embodiment of the present invention.

In Embodiment 1 to 3, the method to separating U, Pu ions and metal ions other than these by controlling the potentials of two types of cathodes has been adopted. In addition to this method, a separation method utilizing a magnetic field is shown below (see PATENT LITERATURE 1). Specifically, as illustrated in FIG. 12, the anode basket 31 inside the crucible 10, the metal fuel pins 33 placed in the basket, and a coil solenoid coil 82 for improvement of separation efficiency around cathodes 40, 41 are set. Like this, a magnetic field direction is set at approximately right angle (60°-90°) with respect to the direction of an electrolysis electric field, and thus $U^{3+}$, $Pu^{3+}$ anodically dissolved from the metal fuel and impurity metal ions can be distributed in the cathode electrode axial direction by the magnetic field in accordance with following chemical formula.

$M/Z=e(Br)^2/2E$(M: mass, Z: charge number of ion, e: electric charge of electron, Br: magnetic flux density, E: electric field) [MATH. 4]

$H=n\frac{1}{2}$(H: central magnetic field of coil, n: number of turns of coil, 1: current) [MATH. 5]

As seen from the formula, the position of the cathodes 40, 41 at which metal ions arrive depends on the value of M/Z. By utilizing this phenomenon, the separation efficiency of electrolytic refining can be improved. Although the separation efficiency depends on the intensity of the magnetic field, the separation efficiency depends on the number of turns of the coil and the current based on the relationship of $B=\mu H$ ($\mu$: magnetic permeability). For instance, when the number of turns is 100, and the current value is 50 A, the central magnetic field H of the coil is 0.25 T (Tesla). The present invention is directed to U and Pu ions, and comparison between the characteristics of ions indicates that the magnetic field necessary in the present invention is 0.01 T or greater. However, in order to achieve an effective efficiency, application of a magnetic field of 0.25 T or greater, which is 10 times greater, is desirable.

Embodiment 6

Figure 13A:
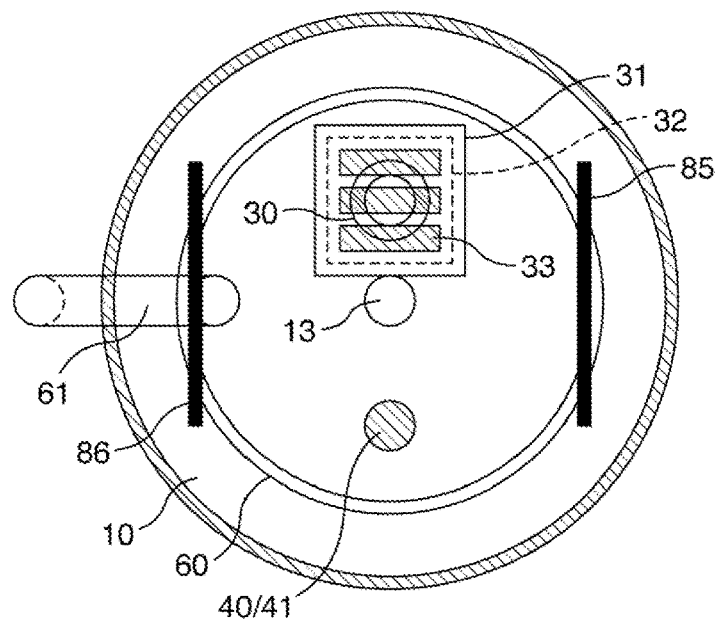
FIG. 13A is a schematic plan view of a crucible structure which utilizes a magnetic field generated by a permanent magnet and is suitable for improvement of a separation efficiency of U and Pu ions according to still another embodiment of the present invention.
Figure 13B:
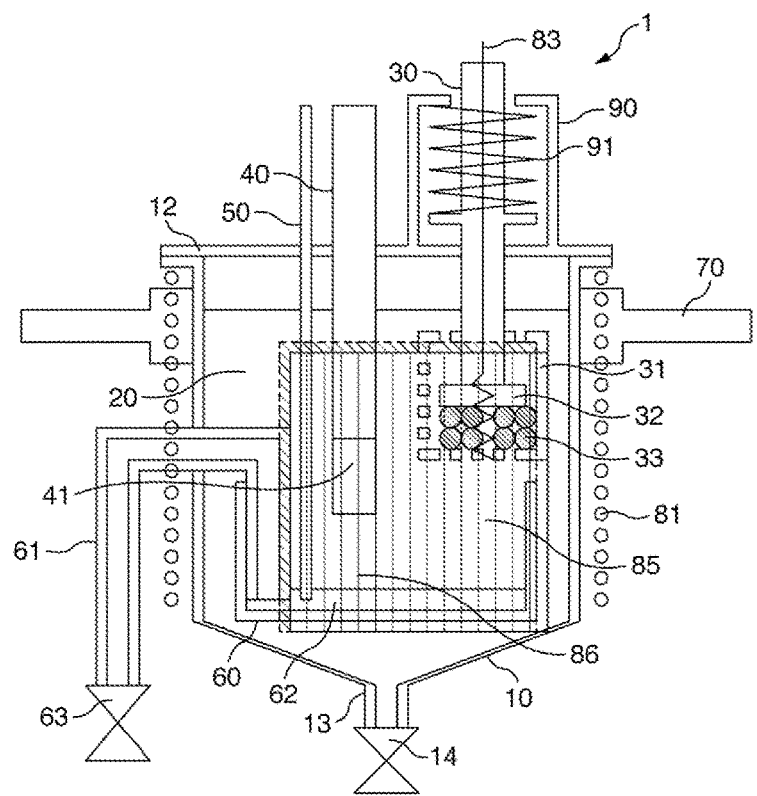
FIG. 13B is a schematic sectional view of a crucible structure which utilizes a magnetic field generated by a permanent magnet and is suitable for improvement of a separation efficiency of U and Pu ions according to still another embodiment of the present invention.

Another embodiment using a magnetic field is illustrated in FIGS. 13A, 13B. In this embodiment, permanent magnets 85 and 86 are disposed around the basket-shaped anode 31 and the cathode 41. The direction of the magnetic field is arranged at a right angle to the arrangement direction of the anode and the cathode. This arrangement allows actinoid element metal ions such as $U^{3+}$, $Pu^{3+}$ ions which have anodically dissolved to be separately distributed in the axial direction of the cathode. Since a permanent magnet is installed in the molten salt at 500° C. in this embodiment, a Curie point of 500° C. or higher is required. Permanent magnets having such a high Curie point include an alnico alloy (Al—Ni—Co), $Nd_2Fe_{14}B$ magnet in addition to samarium-based (Sm) permanent magnet ($SmCo_5$ magnet). Furthermore, these permanent magnets have an advantage that the saturation magnetism is 1 T or greater. Like this, even when a permanent magnet is used, separation efficiency similar to the separation efficiency in Embodiment 5 can be expected.

Figure 13C:
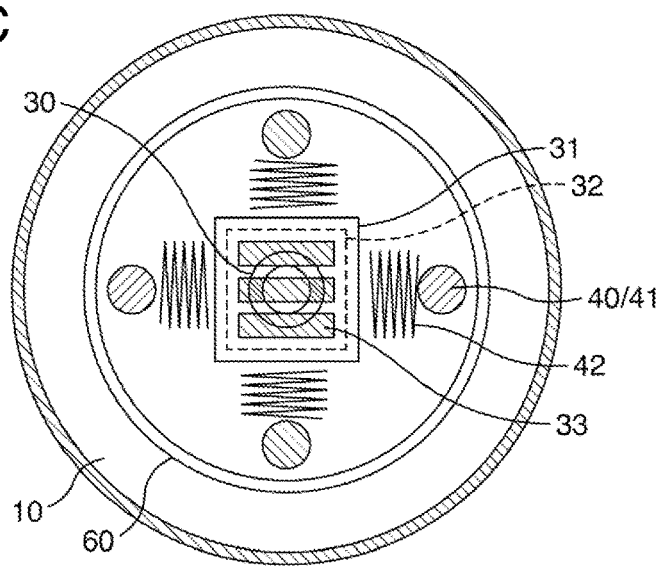
FIG. 13C is a schematic plan view of a crucible structure which utilizes a magnetic field generated by a solenoid coil and is suitable for improvement of a separation efficiency of U and Pu ions according to still another embodiment of the present invention.

Alternatively, a magnetic field can be formed using a solenoid coil instead of the permanent magnet. FIG. 13C illustrates a structure that improves the separation efficiency by a magnetic field formed using a solenoid coil. In this structure, in order to further improve the separation efficiency, four sets of the cathode 41 and the cathode feeder 40 are disposed concentrically. Four sets of solenoid coil 42 are disposed between these cathodes 41 and the basket-shaped anode 31. The relationship between the solenoid coil and the magnetic field is the same as described in Embodiment 5.

Embodiment 7

The decay of radioactive nuclides is broadly divided into $\alpha$-decay and $\beta$-decay. In general, after $\beta$-decay, excessive energy is released and $\gamma$ decay occurs. According to quantum theory, $\beta$-decay has an allowed transition type and a forbidden transition type, and regarding the half-life of $\beta$-decay, in the case of allowed transition type, the half-life is shortened, and in the case of forbidden transition type, the half-life is lengthened. The radioactivity of $\beta$-decay with the long half-life is a major problem for which environmental measures are to be taken. Reiss has studied this problem quantum-theoretically, and reports that $\beta$-decay half-life is shortened by introducing terms regarding allowed transition by utilizing perturbation theory for the Hamiltonian which indicates a decay process (NON PATENT LITERATURE 5). Specifically, it is reported that $\beta$-decay half-life may be shortened by applying a strong electromagnetic field of 200 kHz to 4.4 MHz. Using the crucible of the present invention enables acceleration of $\beta$-decay. In the crucible having the structure illustrated in FIG. 12, using the solenoid coil 82, an electromagnetic field can be applied to the cathode where metal ions are reduced and adsorbed, and U, Pu, and other radioactive elements adsorbed to the liquid Cd cathode electrode. Thus, the effect of shortening $\beta$-decay half-life can be expected.

Embodiment 8

Another embodiment of the $\beta$-decay acceleration method described in Embodiment 7 is shown next. As described in Embodiment 4, when electrolysis is performed, a strong electric field of $10^5$-$10^7$ V/cm is applied to several 10 Å on reaction surface layers of electrodes. As described in Embodiment 7, in addition to simple DC energization at the time of electrolysis, consideration of using AC is meaningful from a viewpoint of acceleration of the decay rate. However, in AC electrolysis, oxidation-reduction reactions occur substantially at the same time, and this is not desirable in this regard. However, with full-wave rectified or half-wave rectified, application of an electromagnetic wave and electrolysis can be performed at the same time. In Embodiment 7, 200 kHz-4.4 MHz is effective, however, when an electric field is directly applied, it is reported that even with DC, a reduction effect on the concentration of radioactive elements of ceramic-like nuclear fuel including U or Pu may be observed at a high temperature. The reduction of the concentration of radioactive elements indicates $\alpha$ or $\beta$-decay rate acceleration phenomenon. In addition, there is also a method of utilizing a high voltage by using DC current or a low-frequency fluctuating current of 50, 60 Hz (NON PATENT LITERATURE 6). In general, application of a high voltage causes electric discharge, and thus voltage application has a limit. When a high voltage is applied, vacuum is set up in many cases. For instance, in this report, application of DC with 3000V or AC with 50-60 Hz in a vacuum is proposed. When a voltage is applied, if a high voltage is applied under a precondition of a macroscopic distance, a high voltage of 3000 V or higher is necessary. Considering an effect on atoms or nuclei physically, not mere voltage but electric field has a significance. In the case of electrolysis in a molten salt, the atoms, which form an electrode surface layer, are to be electrically discharged. However, in the case of electrolysis in water, there is a problem that an electric discharge of water molecules occurs first. In this embodiment, for instance, the electrolytic current in the molten salt is set to 0.41 $A/cm^2$ or lower, and full-wave rectified current with a frequency of 50 Hz or higher is passed. In this case, an electric field is directly applied to the electrode surface layer, and as described in Embodiment 4, a high electric field of $10^5$-$10^7$ V/cm is applied to the surface layer. Essentially, a low-frequency high electric field applied to the radioactive elements on the surface layer causes acceleration of the decay rate. The frequency of low-frequency electromagnetic field is set to 100 KHz-20 MHz, and an AC electromagnetic field is further applied so that the anode potential becomes in a range of −2 to 1 V (V: Ag/AgCl). Like this, low-frequency electrolysis is effective as a high electric field application method. As shown in this embodiment, when both local heating and β-decay rate acceleration are objected, the frequency of low-frequency electromagnetic field is preferably expanded to 1 KHz-20 MHz.

Embodiment 9

Figure 14A:
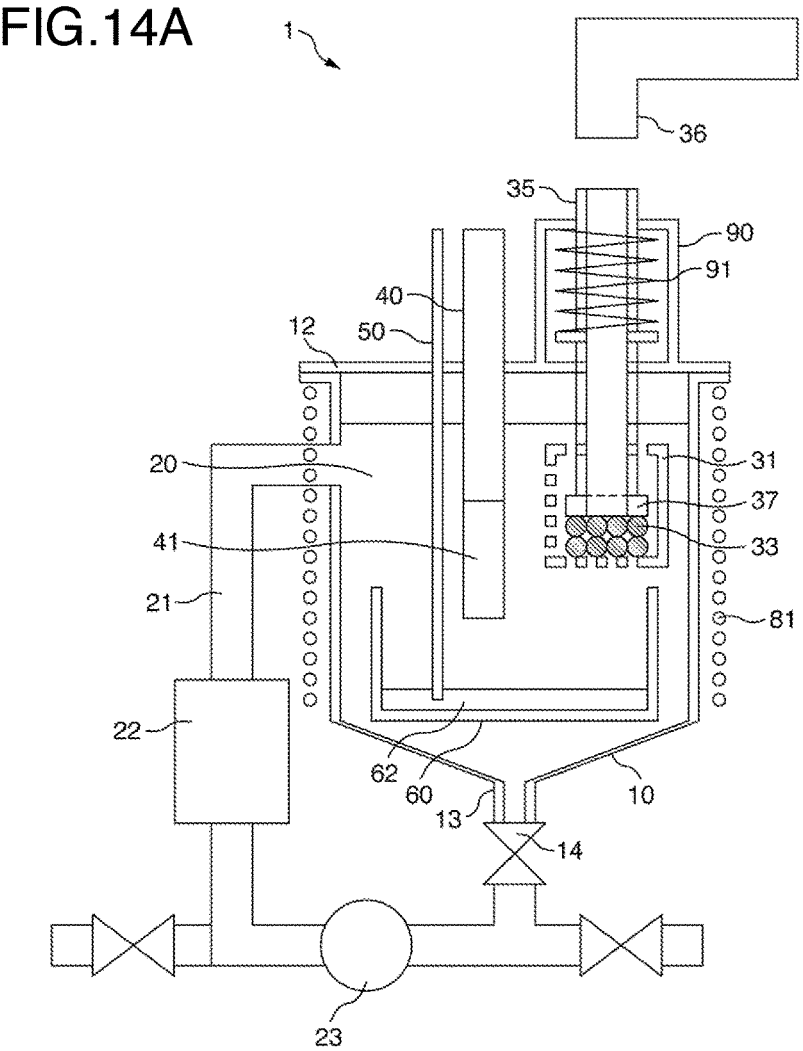
FIG. 14A is a schematic sectional view of a crucible structure utilizing a laser beam for improvement of a separation efficiency according to still another embodiment of the present invention.
Figure 14B:
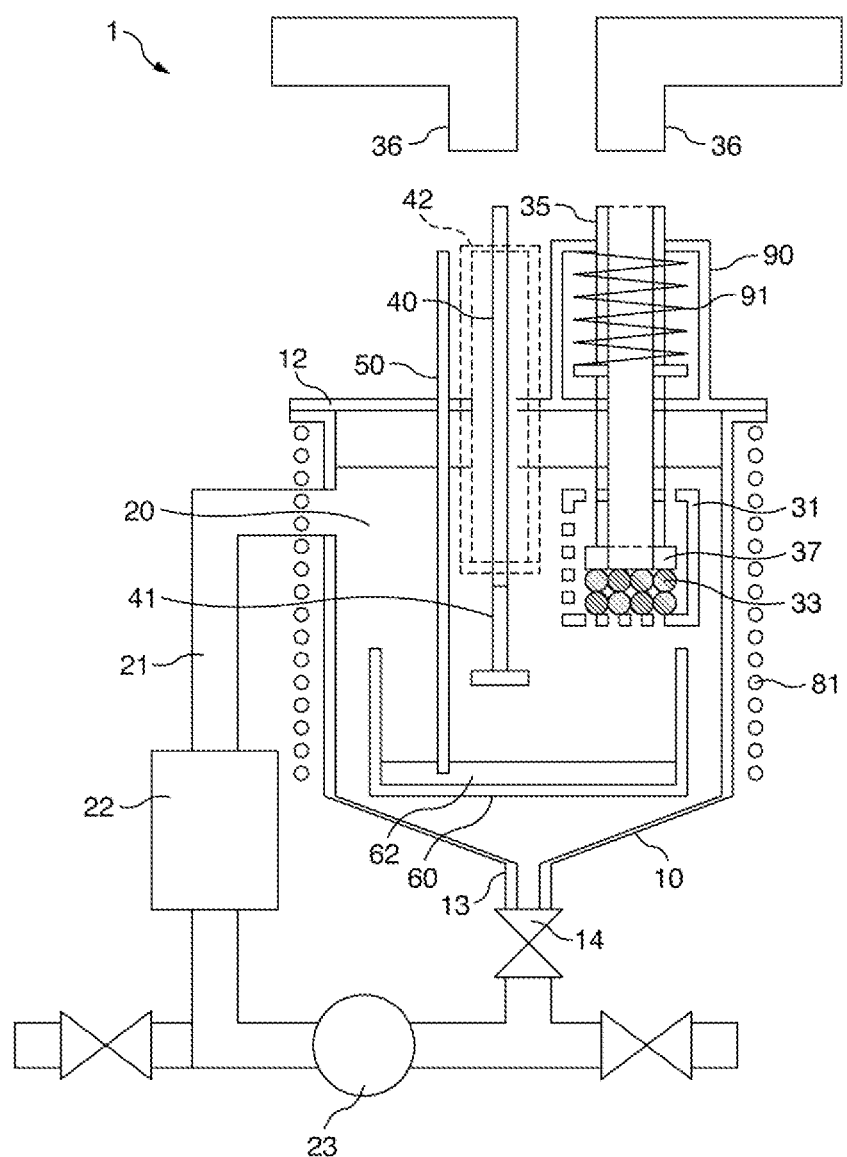
FIG. 14B is a schematic sectional view of a crucible structure utilizing a laser beam for improvement of a separation efficiency according to still another embodiment of the present invention.

Next, an embodiment of an improvement method for the separation efficiency utilizing a laser beam, and an acceleration method for β-decay rate is described. The present embodiment is a crucible utilizing a laser beam, and is illustrated in FIGS. 14A, 14B. In FIG. 14A, a mechanism of irradiating with a laser beam and purifying and agitating the molten liquid is incorporated. Specifically, a hollow anode feeder 35 in the crucible 10 is used, and Pyrex (registered trademark) for passing a laser beam or a fuel pin pressing plate 37 made of quartz is used. The fuel pins 33 are placed in the basket-shaped anode 31, and the fuel pins are irradiated with a laser beam from a laser beam source 36. The fuel pins 33 are locally heated by the laser beam irradiation, and the dissolution efficiency of the anode is improved. For the purpose of pressing down the fuel pin pressing plate 37 to increase the anode dissolution efficiency, a fuel pin pressing spring 91 and a fuel pin pressing spring fixing case 90 are installed. Also, for the purpose of agitating and purifying the molten salt 20, a molten liquid circulation pipe 21 is provided, and a filter 22 and a circulation pump 23 are mounted in the pipe.

Embodiment 10

The crucible structure of another embodiment illustrated in FIG. 14B provides a structure that allows the cathode in addition to the anode to be irradiated with a laser beam. A cathode laser beam guidance tube 42 made of quartz glass is provided around a cathode feeder 40, thereby proving a structure that allows direct irradiation with a laser beam for bringing U, Pu adsorbed to the cathode by metal reduction to an excited state.

For the laser using the crucible structure in FIGS. 14A and 14B, a carbon dioxide laser, a YAG laser, a solar laser and the like capable of high power light emission are suitable. A. V. Simakin et al. have reported regarding phenomenon of acceleration of α-decay rate of U or the like and acceleration of β-decay rate of Pb (212), Tl (208) using a high-power laser such as a YAG laser (NON PATENT LITERATURE 7). The electric field of laser beam photons causes a solid state plasma of radioactive element metal particulates, and generates a plasmon or the like. The energy density of laser beams at this point requires $10^{12}$-$10^{13}$ W/cm$^2$. Furthermore, when metal particulates, in which a plasmon or the like is generated, are irradiated with a laser beam, the energy is amplified by $10^4$ to $10^6$ times. Consequently, the intensity of the laser beam is amplified to $10^{16}$-$10^{18}$ W/cm$^2$. Under such a strong energy state, it is predicted that α-decay rate and/or β-decay rate are accelerated.

It is reported that when the spent nuclear fuel pins in the present invention are electrolytically refined, in the process of dissolving the surface layer of the metal fuel pins placed in the basket-shaped anode, the surface layer is selectively and partially dissolved along a structure (such as a crystal grain boundary) of metal crystals (NON PATENT LITERATURE 8). This indicates that partially undissolved colloidal metal particulates may be released. Conversely, the entire surface of the cathode side is also selectively reduced and precipitated. These phenomena indicate that it is probable that metal colloidal unstable particulates are formed on the electrode surface layer. Microscopic observation of the metal texture shows clusters of crystal grains. Needless to say, many transitions exist inside the crystal grains. When metal is anodically dissolved, first, dissolution starts at a weak portion. The weak portion corresponds to a crystal grain boundary or a portion of transition. When a crystal grain boundary, a transition are selectively dissolved, the remaining crystal grains are more likely to come off. The dimension of crystal grains depends on a processing method, and is extensively distributed from nm order to 10 μm. In the present invention, the fuel pins are injection molded, and thus growth of crystal grains is inhibited, and crystal grains on the order of μm or less were observed (NON PATENT LITERATURE 9). When irradiation with a high-output laser beam is made as described above in a state where metal colloids are formed on the surfaces of the anode and the cathode, the effect of shortening β-decay half-life can be expected.

Although the above description of the embodiments has been made, the present invention is not limited to the embodiments, and it is apparent to those skilled in the art that various changes and modifications may be made within a scope of the spirit of the present invention and the accompanying claims.

REFERENCE SIGNS LIST 1 electrolytic tank
10 crucible
12 crucible cover
13 molten salt drain pipe
14 molten salt drain pipe valve
20 molten salt
21 molten salt circulation pipe
22 molten salt filter
23 circulation pump
30 anode feeder
31 basket-shaped anode
32 fuel pin pressing plate
33 fuel pin
35 hollow anode feeder
36 laser
37 transparent fuel pin pressing plate
39 mechanical oscillation mechanism
40 cathode feeder
41 cathode
42 solenoid coil
50 Cd cathode feeder
60 liquid Cd cathode tank
61 liquid Cd drain pipe
62 liquid Cd
63 liquid Cd drain pipe valve
70 rotational shaft
81 crucible induction heating coil
82 separation efficiency improvement solenoid coil
83 anode local induction heating coil
85 permanent magnet N pole
86 permanent magnet S pole
90 fuel pin pressing spring fixing case
91 fuel pin pressing spring

The invention claimed is:

1. A molten salt electrolysis tank in which electrolytic refining is performed by dissolving a spent metal fuel pin through anodic electrolysis in a crucible filled with a molten salt to cause U and/or Pu to be reduced and precipitated once again on a surface of a cathode, the spent metal fuel pin containing elements including zirconium (Zr) and uranium (U), U and plutonium (Pu), or Zr and U and Pu, the electrolytic tank comprising:
   a crucible induction heating coil disposed around the molten salt electrolysis tank;
   an anode feeder configured to hold the metal fuel pin and supply an anodic potential to the metal fuel pin, the anode feeder comprising a leading end formed in a basket shape to accommodate the spent metal fuel pin, and a mechanism for recovering from an increase of electrical contact resistance between the metal fuel pin and the anode in a course of the anodic electrolysis, the mechanism comprising a pressing plate configured to press the metal fuel pin against the basket-shaped leading end of the anode feeder;
   a cathode feeder that is connected to the cathode and controlled at a potential in a range that causes U and/or Pu ions to be reduced to metal; and
   a solenoid coil or a permanent magnet that is disposed between the anode feeder and the cathode feeder to improve a separation efficiency of the U and/or Pu ions by applying a magnetic field or a combination of an electric field and a magnetic field.

2. The electrolytic tank according to claim 1, the mechanism for recovering from the increase of electrical contact resistance further comprising a heating mechanism provided in the anode feeder for locally heating the metal fuel pin and configured to generate electromagnetic waves.

3. The electrolytic tank according to claim 1, the mechanism for recovering from the increase of electrical contact resistance further comprising a mechanism that generates mechanical oscillation from 50 Hz to 200 kHz disposed at a junction portion between the basket-shaped anode feeder and the pressing plate to cause mechanical oscillation of the pressing plate.

4. The electrolytic tank according to claim 1, further comprising a liquid metal Cd layer for reducing and adsorbing metal such as minor actinoid other than the anodically dissolved U, Pu at a lower portion of the anode feeder; and a Cd cathode feeder electrically connected to the liquid metal Cd layer.

5. The electrolytic tank according to claim 1, further comprising a rotating device having a horizontal rotational shaft mounted on an external wall of the crucible and configured to periodically move the crucible around the rotational shaft to agitate the molten salt and thereby to separate and diffuse a molten salt on surfaces of the anode feeder and the cathode feeder.

6. The electrolytic tank according to claim 1, further comprising a pipe in the crucible for circulating the molten salt, and a filter and a circulation pump in the pipe, configured to circulate and agitate the molten salt to separate and diffuse a molten salt on surfaces of the anode feeder and the cathode feeder and thereby further purify the molten salt.

7. The electrolytic tank according to claim 1, wherein a magnetic field is applied to the crucible, using the solenoid coil or the permanent magnet, in a direction that forms an angle of 60° to 90° with respect to a direction of an electric field applied between the anode feeder and the cathode feeder.

8. The electrolytic tank according to claim 1, further comprising a low-frequency electromagnetic field generator configured to apply a low-frequency electromagnetic field of 100 kHz-20 MHz to the spent metal fuel pin and radioactive metal ions to reduce a concentration of radioactive elements thereon or therein.

9. The electrolytic tank according to claim 1, further comprising a full-wave rectified or half-wave rectified AC power supply configured to supply an electrolytic current for the anodic electrolysis, and applying an electric field having an AC component of $10^5$-$10^7$ V/cm to surface layers on the anode feeder and the cathode feeder to accelerate a β-decay rate materials therein.

10. The electrolytic tank according to claim 1, the mechanism for recovering from the increase of electrical contact resistance further comprises a laser beam irradiation device configured to generate a laser beam having an energy of $10^{12}$ W/cm$^2$ or higher and irradiate the anode feeder and/or the cathode feeder with the laser beam to bring the metal fuel pin and/or the dissolved elements adsorbed on the cathode to a locally excited state, thereby to accelerate α-decay rate and/or β-decay rate.

11. An electrolytic method in which electrolytic refining is performed by dissolving a spent metal fuel pin through anodic electrolysis in a crucible filled with a molten salt to cause U and/or Pu to be reduced and precipitated once again on a surface of a cathode, the spent metal fuel pin containing elements including zirconium (Zr) and uranium (U), U and plutonium (Pu), or Zr and U and Pu, the electrolytic method with an improved electrolytic refining efficiency, comprising:
   providing an anode feeder configured to hold the metal fuel pin and supplying an anodic potential to the metal fuel pin, a leading end portion of the anode feeder being formed in a basket shape to accommodate the spent metal fuel pin therein,
   providing a mechanism in the anode feeder for recovering from an increase of electrical contact resistance between the metal fuel pin and the anode in a course of the anodic electrolysis, the mechanism comprising a pressing plate which automatically presses the metal fuel pin against the basket-shaped anode feeder; and
   controlling a cathode feeder connected to the cathode at a potential in a range that causes U and/or Pu ions to be reduced to metal; and
   disposing a solenoid coil or a permanent magnet between the anode feeder and the cathode feeder to improve a separation efficiency of the U and/or Pu ions by applying a magnetic field or a combination of an electric field and a magnetic field.

12. The electrolytic method according to claim 11, further comprising locally heating the metal fuel pin by an electromagnetic wave.

13. The electrolytic method according to claim 11, wherein, the pressing plate is mechanically oscillated to recover from an increase of electrical contact resistance between the metal fuel pin and the anode feeder in the course of the anodic electrolysis by a mechanism that generates mechanical oscillation from 50 Hz to 200 kHz disposed at a junction portion between the basket-shaped anode feeder and the pressing plate.

14. The electrolytic method according to claim 11, wherein metal such as a minor actinoid other than the anodically dissolved U and Pu is reduced and adsorbed by a liquid metal Cd layer that is disposed at a lower portion of the anode feeder and is electrically connected to a Cd cathode feeder.

15. The electrolytic method according to claim 11, wherein a rotating device that is mounted on an external wall of the crucible and has a horizontal rotational shaft, and the crucible is periodically swung around the rotational shaft to agitate the molten salt, and a molten salt on surfaces of the anode feeder and the cathode feeder are thereby separated and diffused.

16. The electrolytic method according to claim 11, wherein the molten salt is circulated and agitated by a pipe provided to the crucible, and a filter and a circulation pump provided in the pipe, a molten salt on surfaces of the anode feeder and the cathode feeder are separated and diffused, and the molten salt is thereby further purified.

17. The electrolytic method according to claim 11, wherein a magnetic field is applied in a direction that forms an angle of 60° to 90° with respect to a direction of an electric field applied between the anode feeder and the cathode feeder to improve a metal ion separation efficiency, using a solenoid coil or a permanent magnet.

18. The electrolytic method according to claim 11, wherein a low-frequency electromagnetic field of 100 kHz-20 MHz is applied to the spent metal fuel pin and radioactive metal ions to reduce a concentration of radioactive elements therein or thereon.

19. The electrolytic method according to claim 11, wherein full-wave rectified or half-wave rectified AC power supply is used as an electrolytic current, and an electric field having an AC component of $10^5$-$10^7$ V/cm is applied to surface layers on the anode feeder and the cathode feeder to accelerate a β-decay rate.

20. The electrolytic method according to claim 11, wherein the anode feeder and/or the cathode feeder is irradiated with a laser beam having an output of $10^{12}$ W/cm$^2$ or higher as an excitation mechanism to accelerate an α-decay rate and/or a β-decay rate.

* * * * *